Patented Mar. 17, 1936

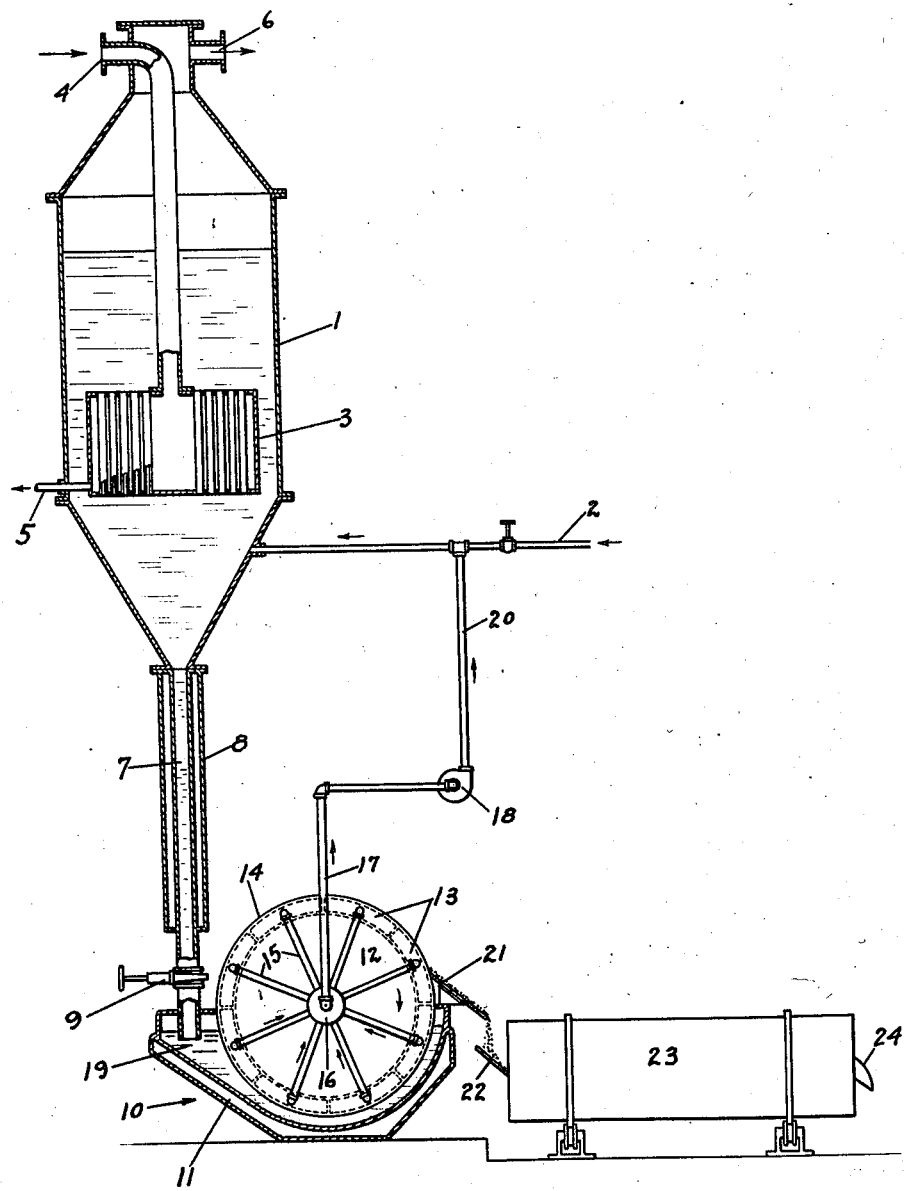

2,033,985

UNITED STATES PATENT OFFICE 2,033,985

METHOD OF SEPARATING SUBSTANTIALLY ANHYDROUS SOLIDS FROM SOLUTIONS

Clifford I. Haney, Drummondville, Quebec, Canada, assignor to Celanese Corporation of America, a corporation of Delaware Application September 27, 1932, Serial No. 635,002

14 Claims. (Cl. 260—122)

This invention relates to a method of concentrating or evaporating solutions of solids, and relates more particularly to the evaporation of aqueous solutions of salts that are difficult to evaporate to complete dryness.

An object of my invention is to provide a method for obtaining dry solids from solutions of the same in an economical and expeditious manner. Other objects of my invention will appear from the following detailed description.

The evaporation of solutions of certain solids, particularly of salts which crystallize with water of crystallization, presents serious difficulties. This is due to the fact that it is not possible to evaporate a solution to dryness in evaporators provided with heating tubes or chambers, since the solids formed by the evaporation of the liquid deposit as incrustations on the walls of the tubes and chambers and render further transfer of heat from them to the liquor in the evaporators ineffective. Therefore in prior practice the liquid has been concentrated until a substantially saturated solution is formed without the formation of appreciable solids, and the concentrated liquor then transferred to open evaporating pans provided with stirrers and heated by gas or oil flames or other hot combustion gases.

Apart from the wastefulness of the prior methods of evaporating to dryness, many difficulties have arisen in connection with its use in the evaporation of solutions of certain salts of which sodium acetate may be given as an example.

Large quantities of aqueous solutions of sodium acetate are formed in many processes, for instance, by neutralizing with sodium carbonate or sodium hydroxide the aqueous solution of acetic acid formed when cellulose acetate is precipitated from its solution in acetic acid, which solution is produced by the acetylation of cellulose, by the addition of water. In order to convert the sodium acetate into glacial acetic acid or acetic anhydride to be used for acetylation, it is important that the sodium acetate be anhydrous. However there is a critical temperature of about 40° C. below which sodium acetate separates out from its solution as crystals containing water of crystallization, and therefore if the liquor removed from the concentrating evaporator is permitted to cool below this temperature, sodium acetate crystals containing water of crystallization are formed and great caution is required to remove such water, since if too high temperatures are employed in the drying, the sodium acetate may be decomposed. Moreover when the liquor from the concentrating evaporator is subjected to further evaporation in drying pans, a stage is reached when the mass contains about 8 to 11% of water which is known as the "heavy" stage, where the drying process must be carried out very slowly and with great caution in order to avoid the formation of hard agglomerates which are difficult and often impossible to break up.

I have found that the process of evaporation of solutions of solids may be greatly simplified and superior products formed by evaporating such solution in a concentrating evaporator until solids or crystals form, removing the liquor and separating the solids therefrom, and then further evaporating the clear liquor and repeating the process either continuously or intermittently as desired.

In accordance with my invention I separate solids from their solutions by evaporating such solutions until part of the solid separates out, removing the liquor from the evaporator and separating the solids from the liquor and then subjecting the separated liquor to further evaporation. The solids or crystals so separated may be dried to remove any moisture mechanically adhering to them.

While this invention in its broad aspects is applicable to the evaporation of solutions of any solid, it is particularly applicable to the treatment of solutions of salts or other solids which crystallize out from aqueous solutions as anhydrous crystals above a certain critical temperature but which form crystals containing water of crystallization when separated from such solutions at lower temperatures. Examples of such salts and their critical temperatures are: sodium acetate, 40° C., sodium formate, 30° C., barium acetate, 40° C., sodium bromide, 60° C., and potassium thiosulfate 80° C.

The evaporation may be carried out in any suitable concentrating evaporator, and generally for economy the concentrating evaporator will be under pressures below atmospheric and the heating done indirectly by steam or other heating fluid passing through chambers, jackets or tubes in heat exchanging relation with the liquor to be evaporated.

In order to separate the solids or crystals formed during the concentrating, the liquid may be passed through any suitable separating devices such as decanters or settling chambers, but for speed of operation I prefer mechanical filters such as centrifugal baskets, leaf filters and, for continuous processes, Oliver or other continuous filters. If the solid that is in the solution is one that forms crystals containing water of crystallization at lower temperatures but not at higher temperatures, precaution will be taken to keep the temperature of the liquor during the separation above such critical temperatures.

The liquor separated from the solids is subjected to further evaporation and conveniently is returned to the evaporator from which it was drawn prior to the separation. If a continuous process is desired, the withdrawal of the liquid from its evaporator, its filtration and return to the evaporator may be done continuously and fresh liquor continuously introduced into the evaporator to maintain its supply.

The solids or crystals separated from the liquor will generally be somewhat moist or wetted with liquor mechanically adhering thereto and these may be dried in a kiln, open evaporating pan or other suitable device. Since the amount of liquid present is quite small, only a small amount of drying is required at this stage.

In order further to explain my invention but without being limited thereto, reference is had to the accompanying drawing wherein, The figure illustrates more or less diagrammatically an apparatus for carrying out my invention.

On the drawing 1 represents an evaporator into which the solution of sodium acetate or other substance to be evaporated is charged by means of a pipe 2. Within the evaporator there is provided the steam chest or basket 3 to which steam or other heating medium is introduced through pipe 4, the condensate from the steam leaving the chest by pipe 5.

The vapors generated by evaporation of the liquor leaves the evaporator 1 by pipe 6 which is preferably connected by a suction pump or other device adapted to reduce the pressure within the evaporator if evaporation under reduced pressure is desired.

The lower portion of the evaporator 1 is connected with an outlet pipe 7, which is preferably surrounded with a jacket 8 so as to permit the heating of the liquor in the pipe 7 by means of steam or other hot fluid. The outlet pipe 7 communicates through the valve 9 with the filter generally indicated at 10. This outlet pipe 7 may be of sufficient height so that the hydrostatic pressure of the liquid at the bottom is equal to the difference between the prevailing atmospheric pressure and the absolute pressure of the vapors in the upper part of the evaporator 1, or if the pipe 7 is to be of shorter length, a pump may be inserted in the line 7 below the valve 9 to provide a positive and controllable feed of the liquor to the filter 10.

The filter 10 shown in the drawing is an Oliver continuous rotary filter, although any suitable filter may be employed. This filter is preferably provided with a jacket 11 through which steam or other heating medium may be passed in order to avoid cooling of the liquor that is being filtered. In some cases the jacket 11 may be made of heat insulating material to maintain the temperature of the liquor being filtered.

The filtering element comprises a rotary drum 12, the surfaces of which is made up of a number of shallow compartments 13 over which is placed a suitable filtering medium 14. The compartments 13 are connected by pipes 15 to ports in the hub 16 which connect with the pipe 17 leading to the pump 18, the arrangement being such that when a compartment 13 emerges from the liquid 19, the port connecting with the suction line 17 closes. The filtrate is returned by the pipe 17 and pump 18 through line 20 to the evaporator 1.

A blade or knife 21 contacting with the periphery of the filter medium 14 is provided to remove the solids filtered out from the solution and these solids drop into chute 22 leading to the dryer 23. The dryer shown on the drawing is in the form of a rotary kiln dryer which is adapted to be heated internally or externally by means of hot combustion gases from gas or oil burners or other devices. The treated material leaves the dryer 23 by the outlet 24.

The following is one of the many modes of carrying out my invention.

An aqueous solution of sodium acetate to be concentrated is introduced by the pipe 2 into the evaporator 1. This solution may be of 20 to 35% concentration and may be formed by neutralizing by means of sodium carbonate or sodium hydroxide the aqueous solution formed by the precipitation of cellulose acetate in the solution of acetic acid as formed in the acetylation of cellulose by the addition of water thereto.

Suction is applied to the pipe 6 so that the pressure prevailing in the evaporator 1 is from 5 to 10 pounds per square inch absolute. Steam is introduced into the chest 3 by means of pipe 4 and the temperature is maintained at the boiling point of the aqueous solution of the sodium acetate at the prevailing pressure, which will be from 60 to 90° C., and the water caused to evaporate. After the sodium acetate solution has become concentrated below the saturation point, the sodium acetate crystals form. Since the temperatures prevailing are those at which anhydrous sodium acetate crystals form, the crystals are anhydrous, that is, free of water of crystallization.

When the solution is sufficiently concentrated so as to form the anhydrous sodium acetate crystals, the valve 9 is opened and the pump 18 caused to operate and the liquor is drawn through the jacketed pipe 7 to the filter 10. Heating medium such as steam is preferably introduced into the jacket 8 to raise the temperature of the liquor in order to reduce its viscosity and render it more readily filterable.

The filtering medium 14 on rotating drum 12 causes the liquid to be filtered, the clear filtrate being returned by pipe 17, pump 18 and pipe 20 to the evaporator 1. The process is now continuous and an amount of fresh sodium acetate solution is introduced continuously through the pipe 2 to maintain the level of the liquid in the evaporator 1 substantially constant.

The blade 21 scrapes the crystals of sodium acetate from the filter medium 14, and these crystals are anhydrous except for any mechanically adhering solution of sodium acetate. The last traces of water are removed from these crystals by passage through the rotary kiln dryer 23 and are collected from its outlet 24.

In order to prevent the liquor contained in the filter 10 from cooling below the temperature at which sodium acetate forms crystals containing water of crystallization (about 40° C.), the jacket 11 of the filter is provided with heat insulating material, or steam or other heating medium may be passed through this jacket 11.

It is to be understood that the foregoing detailed description is given merely by way of illustration and that many variations may be made therein without departing from the spirit of my invention.

Having described my invention what I claim and desire to secure by Letters Patent is:

1. Method of separating substantially anhydrous solids from solutions comprising evaporating an aqueous solution of a solid which forms crystals containing water of crystallization from aqueous solutions below a critical temperature but crystals containing no water of crystallization above such critical temperature while maintaining the temperature above said critical temperature until crystals of the solid are formed, removing said crystals from the liquor while maintaining the temperature above said critical temperature and returning the separated liquor to the bulk of the liquor being evaporated.

2. Method of separating substantially anhydrous sodium acetate from solutions comprising evaporating an aqueous solution of sodium acetate which forms crystals containing water of crystallization from aqueous solutions below a critical temperature but crystals containing no water of crystallization above such critical temperature while maintaining the temperature above said critical temperature until crystals of the sodium acetate are formed. removing said crystals from the liquor while maintaining the temperature above said critical temperature and returning the separated liquor to the bulk of the liquor being evaporated.

3. Method of separating substantially anhydrous sodium acetate from solutions comprising evaporating an aqueous solution of sodium acetate which forms crystals containing water of crystallization from aqueous solutions below a critical temperature but crystals containing no water of crystallization above such critical temperature while maintaining the temperature above said critical temperature until crystals of the sodium acetate are formed, removing said crystals from the liquor while maintaining the temperature above said critical temperature, returning the separated liquor to the bulk of the liquor being evaporated and drying the sodium acetate crystals so separated.

4. Method of continuously separating substantially anhydrous solids from solutions comprising evaporating an aqueous solution of a solid which forms crystals containing water of crystallzation from aqueous solutions below a critical temperature but crystals containing no water of crystallization above such critical temperature while maintaining temperatures above said critical temperature until crystals of the solid are formed, continuously removing said crystals from the liquor while maintaining the temperature above said critical temperature and continuously returning the separated liquor to the bulk of the liquor being evaporated.

5. Method of continuously separating substantially anhydrous sodium acetate from solutions comprising evaporating an aqueous solution of sodium acetate which forms crystals containing water of crystallization from aqueous solutions below a critical temperature but crystals containing no water of crystallization above such critical temperature while maintaining temperatures above said critical temperature until crystals of the sodium acetate are formed. continuously removing said crystals from the liquor while maintaining the temperature above said critical temperature and continuously returning the separated liquor to the bulk of the liquor being evaporated.

6. Method of separating substantially anhydrous sodium acetate from solutions comprising evaporating under reduced pressure an aqueous solution of sodium acetate which forms crystals containing water of crystallization from aqueous solutions below a critical temperature but crystals containing no water of crystallization above such critical temperature while maintaining the temperature above said critical temperature until crystals of the sodium acetate are formed, removing said crystals from the liquor while maintaining the temperature above said critical temperature and returning the separated liquor to the bulk of the liquor being evaporated.

7. Method of separating substantially anhydrous solids from solutions comprising evaporating an aqueous solution of a solid which forms crystals containing water of crystallization from aqueous solutions below a critical temperature but crystals containing no water of crystallization above such critical temperature while maintaining the temperature above said critical temperature until crystals of the solid are formed, withdrawing at least part of the liquor, removing said crystals from the liquor while maintaining the temperature above said critical temperature and returning the separated liquor to the bulk of the liquor being evaporated.

8. Method of separating substantially anhydrous sodium acetate from solutions comprising evaporating an aqueous solution of sodium acetate which forms crystals containing water of crystallization from aqueous solutions below a critical temperature but crystals containing no water of crystallization above such critical temperature while maintaining the temperature above said critical temperature until crystals of the sodium acetate are formed, withdrawing at least part of the liquor, removing said crystals from the liquor while maintaining the temperature above said critical temperature and returning the separated liquor to the bulk of the liquor being evaporated.

9. Method of separating substantially anhydrous sodium acetate from solutions comprising evaporating an aqueous solution of sodium acetate which forms crystals containing water of crystallization from aqueous solutions below a critical temperature but crystals containing no water of crystallization above such critical temperature while maintaining the temperature above said critical temperature until crystals of the sodium acetate are formed, withdrawing at least part of the liquor, removing said crystals from the liquor while maintaining the temperature above said critical temperature, returning the separated liquor to the bulk of the liquor being evaporated and drying the sodium acetate crystals so separated.

10. Method of continuously separating substantially anhydrous solids from solutions comprising evaporating an aqueous solution of a solid which forms crystals containing water of crystallization from aqueous solutions below a critical temperature but crystals containing no water of crystallization above such critical temperature while maintaining temperatures above said critical temperature until crystals of the solid are formed, withdrawing at least part of the liquor, continuously removing said crytals from the liquor while maintaining the temperature above said critical temperature and continuously returning the separated liquor to the bulk of the liquor being evaporated.

11. Method of continuously separating substantially anhydrous sodium acetate from solutions comprising evaporating an aqueous solution of sodium acetate which forms crystals containing water of crystallization from aqueous solutions below a critical temperature but crystals containing no water of crystallization above such critical temperature while maintaining temperatures above said critical temperature until crystals of the sodium acetate are formed, withdrawing at least part of the liquor, continuously removing said crystals from the liquor while maintaining the temperature above said critical temperature and continuously returning the separated liquor to the bulk of the liquor being evaporated.

12. Method of separating substantially anhydrous sodium acetate from solutions comprising evaporating under reduced pressure an aqueous solution of sodium acetate which forms crystals containing water of crystallization from aqueous solutions below a critical temperature but crystals containing no water or crystallization above such critical temperature while maintaining the temperature above said critical temperature until crystals of the sodium acetate are formed, withdrawing at least part of the liquor, removing said crystals from the liquor while maintaining the temperature above said critical temperature and returning the separated liquor to the bulk of the liquor being evaporated.

13. Method of separating substantially anhydrous sodium acetate from solutions, which comprises evaporating an aqueous solution of sodium acetate at a temperature above 40° C. until crystals of sodium acetate are formed, and removing said crystals from the liquor while maintaining the temperature above 40° C.

14. Method of separating substantially anhydrous sodium acetate from solutions, which comprises evaporating an aqueous solution of sodium acetate at a temperature above 40° C. until crystals of sodium acetate are formed, withdrawing at least part of the liquor and removing said crystals from the liquor while maintaining the temperature above 40° C.

CLIFFORD I. HANEY.